United States Patent
Danziger et al.

(10) Patent No.: US 8,097,577 B2
(45) Date of Patent: Jan. 17, 2012

(54) CLEANING COMPOSITIONS WITH ALKOXYLATED POLYALKANOLAMINES

(75) Inventors: James Lee Danziger, Mason, OH (US); Frank Hulskotter, Bad Duerkheim (DE); Dieter Boeckh, Limburgerhof (DE); Sophia Ebert, Mannheim (DE); Andrea Misske, Speyer (DE); Stefan Frenzel, Mannheim (DE)

(73) Assignee: The Procter & Gamble Company, Cincinnati, OH (US)

( * ) Notice: Subject to any disclaimer, the term of this patent is extended or adjusted under 35 U.S.C. 154(b) by 582 days.

(21) Appl. No.: 12/266,740

(22) Filed: Nov. 7, 2008

(65) Prior Publication Data

US 2009/0124529 A1    May 14, 2009

Related U.S. Application Data

(60) Provisional application No. 61/002,738, filed on Nov. 9, 2007.

(51) Int. Cl.
*C11D 3/30* (2006.01)

(52) U.S. Cl. ........ 510/423; 510/356; 510/421; 510/433; 510/499; 510/506

(58) Field of Classification Search ................. 510/356, 510/421, 423, 433, 499, 506
See application file for complete search history.

(56) References Cited

U.S. PATENT DOCUMENTS

| | | | |
|---|---|---|---|
| 2,407,895 A | | 9/1946 | Monson et al. |
| 4,256,800 A * | | 3/1981 | Stockhausen et al. ........ 442/115 |
| 4,404,362 A | | 9/1983 | Bellos |
| 4,448,992 A | | 5/1984 | Diery et al. |
| 4,500,735 A | | 2/1985 | Diery et al. |
| 4,629,468 A | | 12/1986 | Engelhard et al. |
| 4,661,288 A | | 4/1987 | Rubingh et al. |
| 4,731,481 A | | 3/1988 | Bellos et al. |
| 5,059,244 A * | | 10/1991 | King et al. ................. 106/31.32 |
| 5,234,626 A | | 8/1993 | Fikentscher et al. |
| 5,393,463 A * | | 2/1995 | Fikentscher et al. .......... 516/180 |
| 5,565,145 A | | 10/1996 | Watson et al. |
| 5,648,186 A * | | 7/1997 | Daroux et al. ................ 429/308 |
| 6,053,438 A * | | 4/2000 | Romano et al. ................. 241/16 |
| 6,057,278 A | | 5/2000 | Gosselink et al. |
| 6,071,871 A | | 6/2000 | Gosselink et al. |
| 6,075,000 A | | 6/2000 | Rohrbaugh et al. |
| 6,075,168 A * | | 6/2000 | DiGuilio et al. ............. 564/487 |
| 6,087,316 A | | 7/2000 | Watson et al. |
| 6,121,226 A | | 9/2000 | Gosselink et al. |
| 6,127,331 A | | 10/2000 | Cleary et al. |
| 6,475,419 B1 * | | 11/2002 | Lagarden et al. ............. 264/170 |
| 6,677,289 B1 | | 1/2004 | Price et al. |
| 6,703,523 B1 | | 3/2004 | Boeckh et al. |
| 6,740,686 B1 * | | 5/2004 | Ghesquiere et al. .......... 521/129 |
| 6,845,823 B2 * | | 1/2005 | Shiga ............................. 169/46 |
| 7,247,606 B2 * | | 7/2007 | Gross et al. ................... 508/462 |
| 2002/0045563 A1 | | 4/2002 | Boeckh et al. |
| 2003/0100798 A1 * | | 5/2003 | Brun-Buisson et al. ....... 564/476 |
| 2003/0171245 A1 * | | 9/2003 | Goovaerts et al. ............ 510/444 |
| 2006/0047006 A1 * | | 3/2006 | Salamone et al. ............ 514/635 |
| 2006/0234895 A1 | | 10/2006 | Souter et al. |
| 2006/0234898 A1 | | 10/2006 | Schneiderman et al. |
| 2007/0099815 A1 | | 5/2007 | Song et al. |
| 2007/0105742 A1 | | 5/2007 | Scheibel et al. |
| 2007/0275868 A1 | | 11/2007 | Cooremans et al. |
| 2008/0153983 A1 | | 6/2008 | Boeckh et al. |
| 2009/0014029 A1 | | 1/2009 | Borne et al. |
| 2009/0124528 A1 | | 5/2009 | Danziger et al. |
| 2009/0124531 A1 | | 5/2009 | Danziger et al. |
| 2009/0209441 A1 * | | 8/2009 | Lange et al. .................. 508/239 |
| 2010/0234631 A1 * | | 9/2010 | Misske et al. ................... 558/27 |

FOREIGN PATENT DOCUMENTS

EP          0 057 398         8/1982
WO    WO 2006/108856    10/2006

OTHER PUBLICATIONS

PCT International Search Report mailed Apr. 1, 2009.
U.S. Appl. No. 12/341,644, filed Dec. 22, 2008, Jean-Pol Boutique.

* cited by examiner

*Primary Examiner* — Charles Boyer
(74) *Attorney, Agent, or Firm* — Stephen T. Murphy

(57) ABSTRACT

Laundry detergent and cleaning compositions comprising alkoxylated polyalkanolamine polymers obtainable by condensation of N-(hydroxyalkyl)amines and reacting the remaining hydroxy and/or secondary amino groups of the condensation product with alkylene oxides and/or derivatives obtainable by quaternization, protonation, sulphation and/or phosphation of said polymers.

16 Claims, No Drawings

CLEANING COMPOSITIONS WITH ALKOXYLATED POLYALKANOLAMINES

CROSS REFERENCE TO RELATED APPLICATIONS

This application claims priority under 35 U.S.C. §119(e) to U.S. Provisional Application Ser. No. 61/002,738 filed Nov. 9, 2007.

FIELD OF THE INVENTION

The present invention is directed to laundry compositions and cleaning compositions containing alkoxylated polyalkanolamine polymers.

BACKGROUND OF THE INVENTION

Detergent formulators are continuously faced with the task of devising products to remove a broad spectrum of soils and stains from fabrics. Chemically and physico-chemically, the varieties of soils and stains range the spectrum from polar soils, such as proteinaceous, clay, and inorganic soils, to non-polar soils, such as soot, carbon-black, byproducts of incomplete hydrocarbon combustion, and organic soils. The formulation challenge has been accentuated by the recent high interest and motivation to reduce the level of surfactants in cleaning detergents for environmental sustainability and cost reasons. The reduction of level of surfactants naturally leads to an erosion of soil removal and greasy stain removal. Additionally, the global trend of using washing conditions at lower temperature further diminishes cleaning capabilities of typical detergents.

As a result of these trends, there is a need for new laundry and cleaning ingredients that provide hydrophobic and hydrophilic soil cleaning and whiteness maintenance. The material should exhibit good soil detaching capability. They should also minimize the amount of suspended and emulsified soil from redepositing on the surfaces of the textiles or hard surfaces that leads to a dingy appearance on the surfaces. Preferably, the new ingredient would also display a synergy with proteases for removing protease-sensitive stains like grass.

SUMMARY OF THE INVENTION

The present invention relates to novel laundry detergents and cleaning compositions comprising new alkoxylated polyalkanolamine polymers that provide improved anti-redeposition benefits and grease cleaning benefits, even at lower surfactant levels or at reduced temperatures. The laundry detergent or cleaning compositions comprise an alkoxylated polyalkanolamine polymer obtainable by a process comprising the steps of a) condensation of at least one compound selected from N-(hydroxyalkyl)amines of formulae (I.a) and/or (I.b),

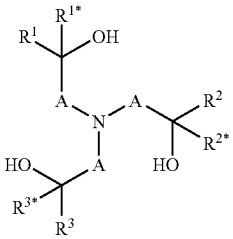

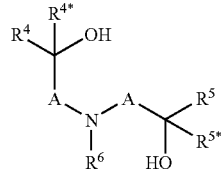

wherein A are independently selected from $C_1$-$C_6$-alkylene; $R^1$, $R^{1*}$, $R^2$, $R^{2*}$, $R^3$, $R^{3*}$, $R^4$, $R^{4*}$, $R^5$ and $R^{5*}$ are independently selected from hydrogen, alkyl, cycloalkyl or aryl, wherein the last three mentioned radicals may be optionally substituted; and $R^6$ is selected from hydrogen, alkyl, cycloalkyl or aryl, wherein the last three mentioned radicals may be optionally substituted; and b) reacting at least a part of the remaining hydroxy groups and/or, if present, at least a part of the secondary amino groups of the polyether provided in step a) with at least one alkylene oxide or derivatives of said alkoxylated polyalkanolamine polymers obtainable by the additional step of c) quarternization, protonation, sulphation and/or phosphation of said polymer.

DETAILED DESCRIPTION OF THE INVENTION

The term "alkyl" as used herein and in the term alkoxy refers to saturated straight-chain or branched hydrocarbon radicals. $C_1$-$C_4$-alkyl refers to saturated straight-chain or branched hydrocarbon radicals having 1 to 4 carbon atoms such as methyl, ethyl, propyl, 1-methylethyl, butyl, 1-methylpropyl, 2-methylpropyl and 1,1-dimethylethyl. Optionally substituted alkyl refers to an alkyl radical which is unsubstituted or wherein a part or all of the hydrogen atoms are replaced by hydroxy, halogen, cyano or $C_1$-$C_4$-alkoxy. Preferably alkyl is unsubstituted.

The term "cycloalkyl" as used herein refers to saturated or partially unsaturated mono- or bicyclic hydrocarbon radicals. Preferably the term cycloalkyl relates to monocyclic hydrocarbon radicals having 3 to 8, in particular 3 to 6 carbon atoms ($C_3$-$C_8$-cycloalkyl, $C_3$-$C_6$-cycloalkyl). Examples of such preferred cycloalkyl radicals are cyclopropyl, cyclobutyl, cyclopentyl, cyclohexyl, cycloheptyl and cyclooctyl. Optionally substituted cycloalkyl refers to a cycloalkyl radical which is unsubstituted or wherein a part or all of the hydrogen atoms are replaced by hydroxy, halogen, cyano, $C_1$-$C_4$-alkyl or $C_1$-$C_4$-alkoxy. Preferably cycloalkyl is unsubstituted or carries 1, 2 or 3 $C_1$-$C_4$-alkyl radicals.

The term "aryl" as used herein refers to phenyl or naphthyl, preferably phenyl. Optionally substituted aryl refers to an aryl radical which is unsubstituted or wherein a part or all of the hydrogen atoms are replaced by hydroxy, halogen, cyano, $C_1$-$C_4$-alkyl or $C_1$-$C_4$-alkoxy. Preferably cycloalkyl is unsubstituted or carries 1, 2 or 3 $C_1$-$C_4$-alkyl radicals.

The term "$C_1$-$C_6$-alkylene" as used herein refers to a saturated, divalent straight chain or branched hydrocarbon chains of 2, 3, 4, 5 or 6 carbon groups, examples including methylene, ethane-1,2-diyl, propane-1,3-diyl, propane-1,2-diyl, 2-methylpropane-1,2-diyl, 2,2-dimethylpropane-1,3-diyl, butane-1,4-diyl, butane-1,3-diyl (=1-methyl-propane-1,3-diyl), butane-1,2-diyl, butane-2,3-diyl, 2-methyl-butan-1,3-diyl, 3-methyl-butan-1,3-diyl (=1,1-dimethylpropane-1,3-diyl), pentane-1,4-diyl, pentane-1,5-diyl, pentane-2,5-diyl, 2-methylpentane-2,5-diyl (=1,1-dimethylbutane-1,3-diyl) and hexane-1,6-diyl.

The term "alkylene oxide" as used herein relates to alkyl or alkylaryl compounds carrying at least one, preferably 1 or 2, in particular 1 epoxy group at the alkyl moieties of the compound. Examples of alkyl compounds carrying one epoxy group are epoxy-ethane (=ethylene oxide), epoxypropane (=propylene oxide), 1,2-epoxybutane (=alpha butylene oxide), 2,3-epoxybutane (=beta butylene oxide), 1,2-epoxy-2-methylpropane (=isobutylene oxide), 1,2-epoxypentane, 2,3-epoxypentane, 1,2-epoxy-2-methylbutane, 2,3-epoxy-2-methylbutane, 1,2-epoxyhexane, 2,3-epoxyhexane and 3,4-epoxyhexane. Examples of alkylaryl compounds carrying one epoxy group are optionally substituted (1,2-epoxyethylene)benzene (=styrene oxide) compounds.

The term "condensation" as used herein refers to a chemical reaction wherein a covalent bond between two corresponding functional groups is formed together with the formal loss of a small molecule such as water. Preferably the term condensation refers to an etherification together with a dehydration reaction.

Laundry Detergents and Cleaning Compositions

The inventive laundry detergent of cleaning composition of the present invention comprises new alkoxylated polyalkanolamine polymers. The alkoxylated polyalkanolamine polymers are obtainable by a process comprising the steps of:
a) condensation of at least one compound selected from N-(hydroxyalkyl)amines of formulae (I.a) and/or (I.b),

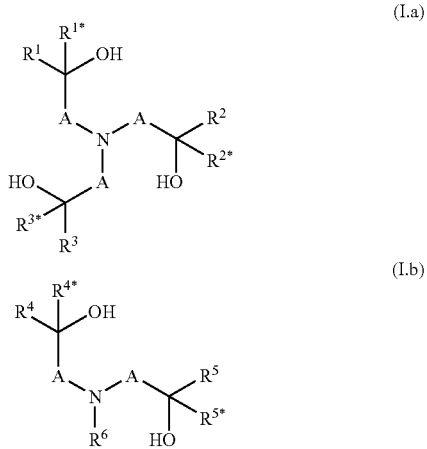

wherein:
A are independently selected from $C_1$-$C_6$-alkylene;
$R^1$, $R^{1*}$, $R^2$, $R^{2*}$, $R^3$, $R^{3*}$, $R^4$, $R^{4*}$, $R^5$ and $R^{5*}$ are independently selected from hydrogen, alkyl, cycloalkyl or aryl, wherein the last three mentioned radicals may be optionally substituted; and
$R^6$ is selected from hydrogen, alkyl, cycloalkyl or aryl, wherein the last three mentioned radicals may be optionally substituted; and
b) reacting at least a part of the remaining hydroxy groups and/or, if present, at least a part of the secondary amino groups of the polyether provided in step a) with at least one alkylene oxide or derivatives of said alkoxylated polyalkanolamine polymers obtainable by the additional step of
c) quaternization, protonation, sulphation and/or phosphation of said polymer.

Examples of N-(Hydroxyalkyl)amines (I.a) are N-tri-(2-hydroxyalkyl)-amines. N-tri-(2-hydroxyalkyl)-amines are obtainable by reacting ammonia with three equivalents of an alkylene oxides (ammonolysis). Preferred examples of such compounds (I.a) are triethanolamine, triisopropanolamine and tributan-2-olamine.

Examples of N-(Hydroxyalkyl)amines (I.b) are e.g. N-di-(2-hydroxyalkyl)-amines which are obtainable by reacting a primary amine of formula $H_2N$—$R^6$, wherein $R^6$ has one of the meanings given above, with two equivalents of an alkylene oxide (aminolysis). Preferred examples of such compounds (I.b) are e.g. N-methyldiethanolamine, N,N-bis-(2-hydroxypropyl)-N-methylamine, N,N-bis-(2-hydroxybutyl)-N-methylamine, N-isopropyldiethanolamine, N-n-butyldiethanolamine, N-sec-butyldiethanolamine, N-cyclohexyldiethanolamine, N-benzyldiethanolamine, N-4-tolyldiethanolamine, N,N-Bis-(2-hydroxyethyl)-anilin and the like.

Preferred are polymers according to the invention obtainable from compounds selected from N-(hydroxyalkyl)amines of formulae (I.a) and/or (I.b), wherein A is a methylene group, which is unsubstituted or carries one substituent selected from $C_{1-4}$-alkyl. More preferred are polymers obtainable from compounds (I.a) and/or (I.b), wherein A is methylene or methylene carrying one methyl group. Particularly preferred are polymers obtainable from compounds (I.a) and/or (I.b), wherein A is unsubstituted methylene.

Furthermore, preferred are polymers according to the invention obtainable from compounds selected from N-(hydroxyalkyl)amines of formulae (I.a) and/or (I.b), wherein $R^1$, $R^{1*}$, $R^2$, $R^{2*}$, $R^3$, $R^{3*}$, $R^4$, $R^{4*}$, $R^5$ and $R^{5*}$ are independently of one another selected from hydrogen and $C_1$-$C_4$-alkyl, i.e. hydrogen, methyl, ethyl, n-propyl, isopropyl, n-butyl, sec.-butyl and tert.-butyl. More preferably $R^1$, $R^{1*}$, $R^2$, $R^{2*}$, $R^3$, $R^{3*}$, $R^4$, $R^{4*}$, $R^5$ and $R^{5*}$ are independently of one another selected from hydrogen and methyl.

In one preferred embodiment the invention relates to polymers obtainable from N-(hydroxyalkyl)amines of formulae (I.a) and/or (I.b), wherein $R^{1*}$, $R^{2*}$, $R^{3*}$, $R^{4*}$ and $R^{5*}$ are hydrogen and $R^1$, $R^2$, $R^3$, $R^4$, and $R^5$ are independently of one another selected from hydrogen and $C_1$-$C_4$-alkyl. More preferably $R^{1*}$, $R^{2*}$, $R^{3*}$, $R^{4*}$ and $R^{5*}$ are hydrogen and $R^1$, $R^2$, $R^3$, $R^4$, and $R^5$ are independently of one another selected from hydrogen and methyl.

The polymer according to the invention is obtainable from N-(hydroxyalkyl)amines of formula (I.b) wherein $R^6$, if present, is preferably selected from hydrogen and $C_1$-$C_4$-alkyl.

The polymer according to the invention preferably is obtainable by a process wherein in step b) the at least one alkylene oxide is selected from epoxyethane, epoxypropane, 1,2-epoxybutane, 2,3-epoxybutane, 1,2-epoxy-2-methylpropane, 1,2-epoxypentane, 2,3-epoxypentane, 1,2-epoxy-2-methylbutane, 2,3-epoxy-2-methyl-butane, 1,2-epoxyhexane, 2,3-epoxyhexane, 3,4-epoxyhexane and 1,2-epoxyethylenebenzene. More preferably the at least one alkylene oxide is selected from epoxyethane and/or epoxypropane.

The polymer according to the invention preferably is obtainable by reacting 1 to 100 moles, preferably 2 to 80 moles of the at least one alkylene oxide with 1 mol of the remaining hydroxy groups and, if present, of the secondary amino groups of the polyether obtainable by condensation of the at least one compound of formulae (I.a) and/or (I.b).

The polymer according to the invention preferably has a number average molecular weight in the range of 500 to 100,000 g/mol, more preferably in the range of 1000 to 80,000 g/mol, and in particular in the range of from 2,000 to 50,000 g/mol. The polymer according to the invention preferably has a polydispersity (Mw/Mn) in the range of 1 to 10, and in particular in the range of 1 to 5.

In one particular embodiment the polymer according to the invention is obtainable by a process wherein in step a) less than 5% by weight, preferably less than 1% by weight and more preferably substantially no, i.e. less than 0.1% by weight, of co-condensable compounds different from compounds of formulae (I.a) and/or (I.b), are employed (i.e. co-condensed) based on the amount of the compounds of formulae (I.a) and/or (I.b).

The term "co-condensable compound" as used herein comprises compounds carrying at least one, preferably at least two acidic hydrogen atoms, such as diols or diamines. Examples for such co-condensable compounds are given below.

In another particular embodiment the polymer according to the invention is obtainable by a process wherein in step a) the at least one compound selected from N-(hydroxyalkyl) amines of formulae (I.a) and/or (I.b) is being co-condensed with at least one compound selected from polyols of formula $Y(OH)_n$, wherein n is an integer from 2 to 4 and Y denotes a bivalent, trivalent or tetravalent aliphatic, cycloaliphatic or aromatic radical having 2 to 10 carbon atoms.

Suitable polyols of formula $Y(OH)_n$ are aliphatic polyols, such as ethylene glycol, propylene glycol, butylene glycol, glycerine, tri(hydroxymethyl)ethane, tri(hydroxymethyl) propane or pentaerythrit, cycloaliphatic polyols, such as 1,4-dihydroxycyclohexane, arylaliphatic polyols, such as 1,4-bis-(hydroxymethyl)benzene, and the like.

If present, the polyols of formula $Y(OH)_n$ are generally co-condensed in an amount of 50% by weight or less based on the amount of the compounds of formulae (I.a) and/or (I.b), i.e. in an amount of from 0.1 to 50% by weight and more preferably in an amount of from 1 to 25% by weight.

In yet another particular embodiment of the invention the polymer is obtainable by a process wherein in step a) the at least one compound selected from N-(hydroxyalkyl)amines of formulae (I.a) and/or (I.b) is being co-condensed with at least one compound selected from polyamins of formula $Y'(NHR^y)_m$, wherein m is an integer from 2 to 4, Y' denotes a bivalent, trivalent or tetravalent aliphatic, cycloaliphatic or aromatic radical having 2 to 10 carbon atoms and $R^y$ has one of the meanings given for $R^6$ or two radicals $R^y$ together may form a $C_1$-$C_6$-alkylene group.

Suitable polyamines of formula $Y'(NHR^y)_m$ are ethylenediamin, N,N'-dimethylethylenediamin, N,N'-diethylethylenediamin, 1,2-diaminopropane, 1,3-diaminopropane, 1,2-diaminocyclohexane, 1,3-diaminocyclohexane, 1,4-diaminocyclohexane, piperazin and the like.

If present, the polyamines of formula $Y'(NHR^y)_m$ are generally co-condensed in an amount of 50% by weight or less based on the amount of the compounds of formulae (I.a) and/or (I.b), i.e. in an amount of from 0.1 to 50% by weight and more preferably in an amount of from 1 to 25% by weight.

The process for preparing the polymers according to the present invention comprises
(a) providing a polyether by condensation of at least one compound selected from N-(hydroxyalkyl)amines of formulae (I.a) and/or (I.b), as defined above, wherein A, $R^1$, $R^{1*}$, $R^2$, $R^{2*}$, $R^3$, $R^{3*}$, $R^4$, $R^{4*}$, $R^5$, $R^{5*}$, $R^6$ and $R^{6*}$ have one of the meanings given above; and
(b) reacting at least a part of the remaining hydroxy and/or, if present, at least a part of the remaining secondary amino groups of the polyether provided in step (a) of the process with at least one alkylene oxide.

Concerning preferred starting compounds and definitions of the radicals A, $R^1$, $R^{1*}$, $R^2$, $R^{2*}$, $R^3$, $R^{3*}$, $R^4$, $R^{4*}$, $R^5$, $R^{5*}$, $R^6$ and $R^{6*}$ for the process according to the present invention reference is made to the specifications outlined above.

Step a)

The condensation of the at least one N-(hydroxyalkyl) amine of formulae (I.a) and/or (I.b) can be performed under the conditions given in e.g. EP 0 441 198 or U.S. Pat. No. 5,393,463. The N-(hydroxyalkyl)amine polyethers are prepared by condensing the N-(hydroxyalkyl)amines of formulae (I.a) and/or (I.b) in the presence of an acid, preferably phosphorous acid ($H_3PO_3$) and/or hypophosphorous acid ($H_3PO_2$). The acid, in particular the phosphorous acid and/or hypophosphorous acid, is preferably used in an amount of from 0.05 to 2% by weight (calculated as 100% acid) and preferably from 0.1 to 1.0% by weight of the N-(hydroxyalkyl)amine(s) to be condensed.

Generally, the condensation reacted is effected using water withdrawing conditions familiar to a skilled person, such as distilling off the water of the reaction. Generally, the temperature used for the condensation is in the range of 120 to 280° C., preferably 150 to 260° C. and more preferably 180 to 240° C. The reaction is generally carried out over a period of from 1 to 16 hours and preferably from 2 to 8 hours. Advantageously, the degree of condensation is controlled by varying the temperature and time of reaction.

The viscosity of the resulting condensation products is in the range of 1,000 to 50,000 mPa·s, preferably 2,000 to 20,000 mPa·s, and more preferably 3,000 to 10,000 mPa·s (measured, in all cases, on the undiluted product at 20° C.).

The number average molecular weight of the resulting condensation products is in the range of 250 to 50,000 g/mol, preferably 500 to 25,000 g/mol, and more preferably 1,000 to 15,000 g/mol.

The hydroxyl number of the resulting condensation products is generally in the range of 200 to 1,500 mg(KOH)/g, and preferably 300 to 1,000 g/mol.

The condensation of the N-(hydroxyalkyl)amines can also be effected by heating the compounds of formulae (I.a) and/or (I.b) and the acid, as defined above, in the presence of an effective amount of an additional catalyst, such as zinc halides or aluminium sulphate or zinc halide/carboxylic acid or $Al_2(SO_4)_3$/carboxylic acid, as described in U.S. Pat. No. 4,505,839. Preferred additional catalysts are ZnCl acetic acid and $Al_2(SO_4)_3$/acetic acid. Generally the additional catalyst if present is used in an amount of 0.01 to 5.0% by weight based on the of the N-(hydroxyalkyl)amine(s) to be condensed, preferably about 0.01 to 1.25% by weight.

One particular embodiment of the invention relates to the process wherein the polyether of step a) is provided by condensation of at least one compound selected from N-(hydroxyalkyl)amines of formulae (I.a) and/or (I.b), wherein less than 5% by weight, preferably less than 1% by weight and more preferably substantially no co-condensable compound, i.e. less than 0.1% by weight, different from compounds formulae (I.a) and/or (I.b) are employed, based on the amount of the compounds of formulae (I.a) and/or (I.b).

Another particular embodiment of the invention relates to the process wherein the polyether of step a) is provided by a co-condensation of at least one compound selected from N-(hydroxyalkyl)amines of formulae (I.a) and/or (I.b), as defined above, with at least one compound selected from polyols of formula $Y(OH)_n$ in which n and Y have one of the meanings given above.

In this embodiment, the polyols of formula $Y(OH)_n$ are generally co-condensed in an amount of 50% by weight or less based on the amount of the compounds of formulae (I.a) and/or (I.b), i.e. in an amount of from 0.1 to 50% by weight and more preferably in an amount of from 1 to 25% by weight, based on the amount of the compounds of formulae (I.a) and/or (I.b). Preferred conditions for the condensation reaction are those outlined above. The amount of acid, in particular phosphorous acid and/or hypophosphorous acid, and/or additional catalyst in this case is calculated on the cumulated amount of compounds of formulae (I.a) and/or (I.b) and of the polyols of formula $Y(OH)_n$.

Yet another particular embodiment of the invention relates to the process wherein the polyether of step a) is provided by a co-condensation of at least one compound selected from N-(hydroxyalkyl)amines of formulae (I.a) and/or (I.b), as defined above, with at least one compound selected from polyamines of formula $Y'(NHR^{y'})_m$ in which m, Y' and $R^{y'}$ have one of the meanings given above.

In this embodiment, the polyamins of formula $Y'(NHR^{y'})_m$ are generally co-condensed in an amount of 50% by weight or less based on the amount of the compounds of formulae (I.a) and/or (I.b), i.e. in an amount of from 0.1 to 50% by weight and more preferably in an amount of from 1 to 25% by weight, based on the amount of the compounds of formulae (I.a) and/or (I.b). Preferred conditions for the condensation reaction are those outlined above. The amount of acid, in particular phosphorous acid and/or hypophosphorous acid, and/or additional catalyst in this case is calculated on the cumulated amount of compounds of formulae (I.a) and/or (I.b) and of the polyamins of formula $Y'(NHR^{y'})_m$.

Step b)

The reaction of the condensation product obtained in step a) of the process according to the invention with the at least one alkylene oxide can be affected according to general alkoxylation procedures known in the art. Generally, step b) of the process according to the invention is performed in the presence of a suitable base. Suitable bases are e.g. alkaline oxides, alkaline earth oxides, alkaline hydroxides, alkaline earth hydroxides, alkaline carbonates, alkaline earth carbonates, alkaline hydrogen carbonates, alkaline earth hydrogen carbonates as well as mixtures thereof. Preferred bases are alkaline hydroxides and alkaline earth hydroxides, such as NaOH, KOH or $Ca(OH)_2$.

The base is generally used in an amount of 5 to 30% by weight, based on the on the amount of remaining hydroxyl groups of the condensation product obtained in step a).

The degree of alkoxylation of the polymer resulting from step b) of the process according to the invention depends on the amount of the at least one alkylene oxide used, as well as from the reaction conditions, such as the reaction temperature.

Therefore, in step b) preferably 1 to 100 moles, preferably 2 to 80 moles of the at least one alkylene oxide are reacted with 1 mol of the remaining hydroxy groups and, if present, of the secondary amino groups of the polyether obtained in step a). The at least one alkylene oxide used in step b) may contain an admixture of an inert gas in an amount of from 5 to 60% by weight.

Customarily, the reaction of step b) is carried out at elevated temperatures, preferably of from 40° C. to 250° C., more preferably from 80° C. to 200° C. and in particular from 100° C. to 150° C.

If more than one alkylene oxide is used in step b) of the process according to the invention the alkylenoxy units of the resulting polymer can be bound to each other in any order. Thus, statistical copolymers, graded copolymers, alternating copolymers or block copolymers can be obtained.

Step c)

A further aspect of the invention relates to derivatives obtainable by c) quarternization, protonation, sulphation and/or phosphation of the polymers according to the present invention. Either the polymers obtained in step b) of the process according to the present invention can be subjected to derivatisation or thus obtained derivatives can be subjected to a further derivatisation. Concerning preferred polymers to be derivatized reference is made to the preferred embodiments mentioned above. Thus, a further aspect of the invention relates to a process for preparing said derivatives comprising subjecting a polymer prepared by steps a) and b) of a process as outlined above to quarternization, protonation, sulphation and/or phosphation.

Derivatives of the polymers according to the invention containing quaternary ammonium groups, i.e. charged cationic groups, can be produced from the amine nitrogen atoms by quaternization with alkylating agents. These include $C_1$-$C_4$-alkyl halides or sulphates, such as ethyl chloride, ethyl bromide, methyl chloride, methyl bromide, dimethyl sulphate and diethyl sulfate. A preferred quaternizing agent is dimethyl sulfate.

Derivatives of the polymers according to the invention containing charged cationic groups (different from quaternary ammonium groups) can also be produced from the amine nitrogen atoms by protonation with acids. Suitable acids are, for example, carboxylic acids, such as lactic acid, or mineral acids, such as phosphoric acid, sulfuric acid and hydrochloric acid.

The sulphation of the polymers according to the present invention can be effected by a reaction with sulphuric acid or with a sulphuric acid derivative. Thus, acidic alkyl ether sulphates are obtained. Suitable sulphation agents are e.g. sulphuric acid (preferably 75 to 100% strength, more preferably 85 to 98% strength), oleum, $SO_3$, chlorosulphuric acid, sulphuryl chloride, amidosulphuric acid and the like. If sulphuryl chloride is being used as sulphation agent the remaining chlorine is being replaced by hydrolysis after sulphation.

The sulphation agent is frequently used in equimolar or amounts or in excess, e.g. 1 to 1.5 moles per mol of OH-group present in the polymer according to the invention. But, the sulphation agent can also be used in sub-equimolar amounts.

The sulphation can be effected in the presence of a solvent or entrainer. A suitable solvent or entrainer is e.g. toluene. After sulphation the reaction mixture is generally neutralized and worked up in a conventional manner.

The phosphation of the polymers according to the present invention can be effected by a reaction with phosphoric acid or with a phosphoric acid derivative. Thus, acidic alkyle ether phosphates are obtained.

Phosphation of the polymers according to the present invention is generally carried out in analogous way to the sulphation described before. Suitable phosphation agents are e.g. phosphoric acid, polyphosphoric acid, phosphorous pentoxide, $POCl_3$ and the like. If $POCl_3$ is being used as sulphation agent the remaining chlorine is being replaced by hydrolysis after sulphation.

The alkoxylated polyalkanolamine polymers according to the present invention can be added to the laundry detergents and cleaning compositions in amounts of generally from 0.05 to 10% by weight, preferably from 0.1 to 5% by weight and more preferably from 0.25 to 2.5% by weight, based on the particular overall composition.

In addition, the laundry detergents and cleaning compositions generally comprise surfactants and, if appropriate, other polymers as washing substances, builders and further customary ingredients, for example cobuilders, complexing agents, bleaches, standardizers, graying inhibitors, dye transfer inhibitors, enzymes and perfumes.

The alkoxylated polyalkanolamines of the present invention may be utilized in laundry detergents or cleaning compositions comprising a surfactant system comprising $C_{10}$-$C_{15}$ alkyl benzene sulfonates (LAS) and one or more co-surfactants selected from nonionic, cationic, anionic or mixtures thereof. The selection of co-surfactant may be dependent upon the desired benefit. In one embodiment, the co-surfactant is selected as a nonionic surfactant, preferably $C_{12}$-$C_{18}$ alkyl ethoxylates. In another embodiment, the co-surfactant is selected as an anionic surfactant, preferably $C_{10}$-$C_{18}$ alkyl alkoxy sulfates ($AE_xS$) wherein x is from 1-30. In another embodiment the co-surfactant is selected as a cationic surfactant, preferably dimethyl hydroxyethyl lauryl ammonium chloride. If the surfactant system comprises $C_{10}$-$C_{15}$ alkyl benzene sulfonates (LAS), the LAS is used at levels ranging from about 9% to about 25%, or from about 13% to about 25%, or from about 15% to about 23% by weight of the composition.

The surfactant system may comprise from 0% to about 7%, or from about 0.1% to about 5%, or from about 1% to about 4% by weight of the composition of a co-surfactant selected from a nonionic co-surfactant, cationic co-surfactant, anionic co-surfactant and any mixture thereof.

Non-limiting examples of nonionic co-surfactants include: $C_{12}$-$C_{18}$ alkyl ethoxylates, such as, NEODOL® nonionic surfactants from Shell; $C_6$-$C_{12}$ alkyl phenol alkoxylates wherein the alkoxylate units are a mixture of ethyleneoxy and propyleneoxy units; $C_{12}$-$C_{18}$ alcohol and $C_6$-$C_{12}$ alkyl phenol condensates with ethylene oxide/propylene oxide block alkyl polyamine ethoxylates such as PLURONIC® from BASF; $C_{14}$-$C_{22}$ mid-chain branched alcohols, BA, as discussed in U.S. Pat. No. 6,150,322; $C_{14}$-$C_{22}$ mid-chain branched alkyl alkoxylates, $BAE_x$, wherein x is from 1-30, as discussed in U.S. Pat. No. 6,153,577, U.S. Pat. No. 6,020,303 and U.S. Pat. No. 6,093,856; alkylpolysaccharides as discussed in U.S. Pat. No. 4,565,647 Llenado, issued Jan. 26, 1986; specifically alkylpolyglycosides as discussed in U.S. Pat. No. 4,483,780 and U.S. Pat. No. 4,483,779; polyhydroxy fatty acid amides as discussed in U.S. Pat. No. 5,332,528; and ether capped poly(oxyalkylated) alcohol surfactants as discussed in U.S. Pat. No. 6,482,994 and WO 01/42408.

Non-limiting examples of semi-polar nonionic co-surfactants include: water-soluble amine oxides containing one alkyl moiety of from about 10 to about 18 carbon atoms and 2 moieties selected from the group consisting of alkyl moieties and hydroxyalkyl moieties containing from about 1 to about 3 carbon atoms; water-soluble phosphine oxides containing one alkyl moiety of from about 10 to about 18 carbon atoms and 2 moieties selected from the group consisting of alkyl moieties and hydroxyalkyl moieties containing from about 1 to about 3 carbon atoms; and water-soluble sulfoxides containing one alkyl moiety of from about 10 to about 18 carbon atoms and a moiety selected from the group consisting of alkyl moieties and hydroxyalkyl moieties of from about 1 to about 3 carbon atoms. See WO 01/32816, U.S. Pat. No. 4,681,704, and U.S. Pat. No. 4,133,779.

Non-limiting examples of cationic co-surfactants include: the quaternary ammonium surfactants, which can have up to 26 carbon atoms include: alkoxylate quaternary ammonium (AQA) surfactants as discussed in U.S. Pat. No. 6,136,769; dimethyl hydroxyethyl quaternary ammonium as discussed in U.S. Pat. No. 6,004,922; dimethyl hydroxyethyl lauryl ammonium chloride; polyamine cationic surfactants as discussed in WO 98/35002, WO 98/35003, WO 98/35004, WO 98/35005, and WO 98/35006; cationic ester surfactants as discussed in U.S. Pat. Nos. 4,228,042, 4,239,660 4,260,529 and U.S. Pat. No. 6,022,844; and amino surfactants as discussed in U.S. Pat. No. 6,221,825 and WO 00/47708, specifically amido propyldimethyl amine (APA).

Nonlimiting examples of anionic co-surfactants useful herein include: $C_{10}$-$C_{20}$ primary, branched chain and random alkyl sulfates (AS); $C_{10}$-$C_{18}$ secondary (2,3) alkyl sulfates; $C_{10}$-$C_{18}$ alkyl alkoxy sulfates ($AE_xS$) wherein x is from 1-30; $C_{10}$-$C_{18}$ alkyl alkoxy carboxylates comprising 1-5 ethoxy units; mid-chain branched alkyl sulfates as discussed in U.S. Pat. No. 6,020,303 and U.S. Pat. No. 6,060,443; mid-chain branched alkyl alkoxy sulfates as discussed in U.S. Pat. No. 6,008,181 and U.S. Pat. No. 6,020,303; modified alkylbenzene sulfonate (MLAS) as discussed in WO 99/05243, WO 99/05242 and WO 99/05244; methyl ester sulfonate (MES); and alpha-olefin sulfonate (AOS).

The present invention may also relates to compositions comprising the inventive alkoxylated polyalkanolamines and a surfactant system comprising $C_8$-$C_{18}$ linear alkyl sulphonate surfactant and a co-surfactant. The compositions can be in any form, namely, in the form of a liquid; a solid such as a powder, granules, agglomerate, paste, tablet, pouches, bar, gel; an emulsion; types delivered in dual-compartment containers; a spray or foam detergent; premoistened wipes (i.e., the cleaning composition in combination with a nonwoven material such as that discussed in U.S. Pat. No. 6,121,165, Mackey, et al.); dry wipes (i.e., the cleaning composition in combination with a nonwoven materials, such as that discussed in U.S. Pat. No. 5,980,931, Fowler, et al.) activated with water by a consumer; and other homogeneous or multiphase consumer cleaning product forms.

In one embodiment, the cleaning composition of the present invention is a liquid or solid laundry detergent composition. In another embodiment, the cleaning composition of the present invention is a hard surface cleaning composition, preferably wherein the hard surface cleaning composition impregnates a nonwoven substrate. As used herein "impregnate" means that the hard surface cleaning composition is placed in contact with a nonwoven substrate such that at least a portion of the nonwoven substrate is penetrated by the hard surface cleaning composition, preferably the hard surface cleaning composition saturates the nonwoven substrate. The cleaning composition may also be utilized in car care compositions, for cleaning various surfaces such as hard wood, tile, ceramic, plastic, leather, metal, glass. This cleaning composition could be also designed to be used in a personal care and pet care compositions such as shampoo composition, body wash, liquid or solid soap and other cleaning composition in which surfactant comes into contact with free hardness and in all compositions that require hardness tolerant surfactant system, such as oil drilling compositions.

In another embodiment the cleaning composition is a dish cleaning composition, such as liquid hand dishwashing compositions, solid automatic dishwashing compositions, liquid automatic dishwashing compositions, and tab/unit does forms of automatic dishwashing compositions.

Quite typically, cleaning compositions herein such as laundry detergents, laundry detergent additives, hard surface cleaners, synthetic and soap-based laundry bars, fabric softeners and fabric treatment liquids, solids and treatment articles of all kinds will require several adjuncts, though certain simply formulated products, such as bleach additives, may require only, for example, an oxygen bleaching agent and a surfactant as described herein. A comprehensive list of suitable laundry or cleaning adjunct materials can be found in WO 99/05242.

Common cleaning adjuncts include builders, enzymes, polymers not discussed above, bleaches, bleach activators, catalytic materials and the like excluding any materials already defined hereinabove. Other cleaning adjuncts herein can include suds boosters, suds suppressors (antifoams) and the like, diverse active ingredients or specialized materials such as dispersant polymers (e.g., from BASF Corp. or Rohm & Haas) other than those described above, color speckles, silvercare, anti-tarnish and/or anti-corrosion agents, dyes, fillers, germicides, alkalinity sources, hydrotropes, anti-oxidants, enzyme stabilizing agents, pro-perfumes, perfumes, solubilizing agents, carriers, processing aids, pigments, and, for liquid formulations, solvents, chelating agents, dye transfer inhibiting agents, dispersants, brighteners, suds suppressors, dyes, structure elasticizing agents, fabric softeners, anti-abrasion agents, hydrotropes, processing aids, and other fabric care agents, surface and skin care agents. Suitable examples of such other cleaning adjuncts and levels of use are found in U.S. Pat. Nos. 5,576,282, 6,306,812 B1 and 6,326,348 B1.

Method of Use

The present invention includes a method for cleaning a targeted surface. As used herein "targeted surface" may include such surfaces such as fabric, dishes, glasses, and other cooking surfaces, hard surfaces, hair or skin. As used herein "hard surface" includes hard surfaces being found in a typical home such as hard wood, tile, ceramic, plastic, leather, metal, glass. Such method includes the steps of contacting the composition comprising the modified polyol compound, in neat form or diluted in wash liquor, with at least a portion of a targeted surface then optionally rinsing the targeted surface. Preferably the targeted surface is subjected to a washing step prior to the aforementioned optional rinsing step. For purposes of the present invention, washing includes, but is not limited to, scrubbing, wiping and mechanical agitation.

As will be appreciated by one skilled in the art, the cleaning compositions of the present invention are ideally suited for use in home care (hard surface cleaning compositions) and/or laundry applications.

The composition solution pH is chosen to be the most complimentary to a target surface to be cleaned spanning broad range of pH, from about 5 to about 11. For personal care such as skin and hair cleaning pH of such composition preferably has a pH from about 5 to about 8 for laundry cleaning compositions pH of from about 8 to about 10. The compositions are preferably employed at concentrations of from about 200 ppm to about 10,000 ppm in solution. The water temperatures preferably range from about 5° C. to about 100° C.

For use in laundry cleaning compositions, the compositions are preferably employed at concentrations from about 200 ppm to about 10000 ppm in solution (or wash liquor). The water temperatures preferably range from about 5° C. to about 60° C. The water to fabric ratio is preferably from about 1:1 to about 20:1.

The method may include the step of contacting a nonwoven substrate impregnated with an embodiment of the composition of the present invention As used herein "nonwoven substrate" can comprise any conventionally fashioned nonwoven sheet or web having suitable basis weight, caliper (thickness), absorbency and strength characteristics. Examples of suitable commercially available nonwoven substrates include those marketed under the tradename SONTARA® by DuPont and POLYWEB® by James River Corp.

As will be appreciated by one skilled in the art, the cleaning compositions of the present invention are ideally suited for use in liquid dish cleaning compositions. The method for using a liquid dish composition of the present invention comprises the steps of contacting soiled dishes with an effective amount, typically from about 0.5 ml. to about 20 ml. (per 25 dishes being treated) of the liquid dish cleaning composition of the present invention diluted in water.

Analytical Methods

Amine Number

The Amine Number was determined according to DIN 53176 by titration of a solution of the polymer in acetic acid with perchloric acid.

Hydroxy Number

The Hydroxy number was determined according to DIN 53240 by heating the sample in pyridine with acetic acid anhydride and acetic acid, followed by titration with potassium hydroxide.

Number Average Molecular Weight

The Molecular weight (Mn) was determined by size exclusion chromatography with hexafluoroisopropanol as eluent.

Viscosity

The viscosity of the pure polymers was measured with a rotary viscometer (Haake) at 20° C.

EXAMPLES

Polymer Examples

Alkoxylated polyalkanolamines have been synthesized in analogy to the method described in the literature (e.g. EP 0 441 198, U.S. Pat. No. 5,393,463) by condensation or co-condensation in presence of hypophosphorous acid. The alkoxylation was carried out in presence of a catalytic agent like KOH, NaOH under conventional conditions.

Example 1

Preparation of an Ethoxylated Triethanolamine Condensate 1.a) Condensation of triethanolamine (3.5 h)—A mixture of triethanolamine (1499.7 g) and an aqueous solution of hypophosphorous acid (50% strength, 9.75 g) was heated at 227° C. with stirring under a weak stream of nitrogen. The water of reaction was distilled off. After 3.5 hours the mixture was cooled to room temperature. A slightly yellow liquid having a viscosity of 3145 mPas and a hydroxyl number of 723.7 mg(KOH)/g was obtained. The molecular weight was determined by size exclusion chromatography (SEC). Weight average molecular weight: Mw=5,700 g/mol; Polydispersity: Mw/Mn=1.8.

1.b) Ethoxylation of poly-triethanolamine—The polyethanolamine (77.52 g) obtained under 1.a) and an aqueous solution of potassium hydroxide (40% strength, 2.9 g) are introduced into an autoclave and stirred under vacuum at 100° C. for 2.0 hours. The mixture was reacted with ethylene oxide (1,056 g, 24 eq. EO/OH), added in portions at 120° C. To complete the reaction, the mixture was allowed to post-react for 2 hours under pressure. The reaction mixture was stripped with nitrogen and volatile compounds were removed in vacuo at 80° C. A brown oily solid was obtained (1,110 g) having an amine number of 0.4007 mmol/g. The average degree of ethoxylation was 23.4 ethylene oxide units added per hydroxyl groups.

Example 2

Condensation of Triethanolamine (4.5 h)

A mixture of triethanolamine (1491.9 g) and an aqueous solution of hypophosphorous acid (50% strength, 9.7 g) was heated at 227° C. with stirring under a weak stream of nitrogen. The water of reaction was distilled off. After 4.5 hours the mixture was cooled to room temperature. A yellow liquid having a viscosity of 4490 mPas and a hydroxyl number of 587.1 mg(KOH)/g was obtained. The molecular weight was determined by size exclusion chromatography (SEC). Weight average molecular weight: Mw=7,800 g/mol; Polydispersity: Mw/Mn=2.1.

Example 3

Preparation of an Ethoxylated Triethanolamine Condensate 3.a) Condensation of triethanolamine (7.0 h)—A mixture of triethanolamine (1491.9 g) and an aqueous solution of hypophosphorous acid (50% strength, 9.7 g) was heated at 227° C. with stirring under a weak stream of nitrogen. The water of reaction was distilled off. After 7.0 hours the mixture was cooled to room temperature. A yellow oil having a viscosity of 8,260 mPas and a hydroxyl number of 489.8 mg (KOH)/g was obtained. The molecular weight was determined by size exclusion chromatography (SEC). Weight average molecular weight: Mw=13,500 g/mol; Polydispersity: Mw/Mn=3.1.

3.b) Ethoxylation of poly-triethanolamine—The polyethanolamine (114.5 g) obtained under 3.a) and an aqueous solution of potassium hydroxide (40% strength, 4.3 g) are introduced into an autoclave and stirred under vacuum at 100° C. for 2.0 hours. The mixture was reacted with ethylene oxide (1,056 g, 24 eq. EO/OH), added in portions at 120° C. To complete the reaction, the mixture was allowed to post-react for 2 hours under pressure. The reaction mixture was stripped with nitrogen and volatile compounds were removed in vacuo at 80° C. A brown oily solid was obtained (1,143.1 g) having an amine number of 0.9158 mmol/g. The average degree of ethoxylation was 23.1 ethylene oxide units added per hydroxyl group.

Example 4

Preparation of a Propoxylated Ethoxylated Triethanolamine Condensate 4.a) Condensation of triethanolamine (7.5 h)—A mixture of triethanolamine (1506 g) and an aqueous solution of hypophosphorous acid (50% strength, 9.8 g) was heated at 227° C. with stirring under a weak stream of nitrogen. The water of reaction was distilled off. After 7.5 hours the mixture was cooled to room temperature. A yellow oil having a viscosity of 9,432 mPas and a hydroxyl number of 463 mg(KOH)/g was obtained. The molecular weight was determined by size exclusion chromatography (SEC). Weight average molecular weight: Mw=13,600 g/mol; Mw/Mn=3.2.

4.b) Ethoxylation of poly-triethanolamine—A mixture of the polyethanolamine (109.2 g) obtained under 4.a) and an aqueous solution of potassium hydroxide (40% strength, 7.2 g) was introduced into an autoclave and stirred under vacuum at 100° C. for 2.0 hours. The mixture was reacted with ethylene oxide (960.2 g, 24 eq. EO/OH), added in portions at 120° C. To complete the reaction, the mixture was allowed to post-react for 2 hours under pressure. The reaction mixture was stripped with nitrogen and volatile compounds were removed in vacuo at 80° C. A brown oily solid (1054.3 g) having an amine number of 0.9885 mmol/g was obtained. The average degree of ethoxylation was 23.6 ethylene oxide units added per hydroxyl group. The molecular weight was determined by size exclusion chromatography (SEC). Weight average molecular weight: Mw=43,000 g/mol; Polydispersity: Mw/Mn=1.5.

4.c) Propoxylation of ethoxylated of poly-triethanolamine—The ethoxylated polyethanolamine (603.4 g) obtained under 4.b) was introduced into an autoclave and reacted with propylene oxide (483.3 g; 16 eq. PO/OH), added in portions at 120° C. To complete the reaction, the mixture was allowed to post-react for 2 hours under pressure. The reaction mixture was stripped with nitrogen and volatile compounds were removed in vacuo at 80° C. A brown oily solid (1087.0 g) having an amine number of 0.453 mmol/g was obtained. The average degree of propoxylation was 16.0 moles of propylene oxide added per hydroxyl group. The molecular weight was determined by size exclusion chromatography (SEC). Weight average molecular weight: Mw=54,000 g/mol; Polydispersity: Mw/Mn=1.9.

Example 5

Preparation of an Ethoxylated Diethanolamine Condensate 5.a) Condensation of diethanolamine—A mixture of diethanolamine (1078.9 g) and an aqueous solution of hypophosphorous acid (50% strength, 10.16 g) was heated at 227° C. with stirring under a weak stream of nitrogen. The water of reaction was distilled off. After 7.0 hours the mixture was cooled to room temperature. A yellow, oily liquid having an amine number of 803.5 mg (KOH)/g was obtained.

5.b) Ethoxylation of poly-diethanolamine—The polyethanolamine (69.8 g) obtained under 5.a) and an aqueous solution of potassium hydroxide (40% strength, 2.6 g) were introduced into an autoclave and stirred under vacuum at 100° C. for 2.0 hours. The mixture was reacted with ethylene oxide (1,056 g, 24 eq. EO/OH) added in portions at 120° C. To complete the reaction, the mixture was allowed to post-react for 2 hours under pressure. The reaction mixture was stripped with nitrogen and volatile compounds were removed in vacuo at 80° C. A brown oily solid (1,126.1 g) having an amine number of 1.913 mmol/g was obtained.

Example 6

Co-condensation of Triethanolamine and Glycerine

A mixture of triethanolamine (746.0 g), glycerine (460.5 g) and of an aqueous solution of hypophosphorous acid (50% strength, 9.7 g) was heated at 227° C. with stirring under a weak stream of nitrogen. The water of reaction was distilled off. After 7.0 hours the mixture was cooled to room temperature. A yellow liquid having a hydroxyl number of 830 mg (KOH)/g was obtained. The molecular weight was determined by size exclusion chromatography (SEC). Weight average molecular weight: Mw=7,000 g/mol; Polydispersity: Mw/Mn=1.9.

Example 7

Ethoxylation of the Condensation Product of Triethanolamine and Glycerine

The condensation product obtained under 6) (67.6 g) and an aqueous solution of potassium hydroxide (40% strength, 2.5 g) are introduced into an autoclave and stirred under vacuum at 100° C. for 2.0 hours. The mixture was reacted with ethylene oxide (approx. 1,056 g, approx. 24 eq. EO/OH) added in portions at 120° C. To complete the reaction, the mixture was allowed to post-react for 2 hours under pressure. The reaction mixture was stripped with nitrogen and volatile compounds were removed in vacuo at 80° C. A brown oily solid was obtained (1,154.5 g). The average degree of ethoxylation was 24.7 ethylene oxide units added per hydroxyl group.

Example 8

Propoxylation of Poly-Triethanolamine

The polyethanolamine (132.0 g) obtained under 4.a) and an aqueous solution of potassium hydroxide (40% strength, 8.4 g) are introduced into an autoclave and stirred under vacuum at 100° C. for 2.0 hours. The mixture was reacted with propylene oxide (966.8 g, 16 eq. PO/OH) added in portions at 120° C. To complete the reaction, the mixture was allowed to post-react for 2 hours under pressure. The reaction mixture was stripped with nitrogen and volatile compounds were removed in vacuo at 80° C. A brown oily solid was obtained. The average degree of propoxylation is 16 propylene oxide units added per hydroxyl group.

Example 9

Quarternization of Ethoxylated Poly-Triethanolamin

Dimethyl sulphate (41.5 g) is added dropwise to the ethoxylated polytriethanolamine (350 g) obtained under 4.b) at 70 to 75° C. under nitrogen atmosphere. The reaction mixture is stirred at 70° C. for 5 hours and cooled to room temperature. Methylated polytriethanolamin alkoxylated with 24 moles of ethylene oxide units per mole of OH— groups was obtained as a brown solid (384 g) having an amine number of 0.0 mmol/g. The degree of quaternization was 100%.

Example 10

Sulphation

Sulphuric acid (96%, 4.4 g) was added to the ethoxylated fully quarternized polytriethanolamine obtained in Example 9) at 60° C. under nitrogen atmosphere. The reaction mixture was kept at a temperature of 90° C. and at a pressure of 10 mbar for 3 hours. After cooling the reaction mixture to 60° C. the pH-value was adjusted to 8 to 8.6 by addition of an aqueous solution of sodium hydroxide (50%, 21.0 g). A brown solid containing 4.9% of water was obtained (215 g).

Composition Formulations

Example 11

Granular Laundry Detergent

| Formula | A wt % | B wt % | C wt % | D wt % | E wt % |
|---|---|---|---|---|---|
| $C_{11-12}$ Linear alkyl benzene sulphonate | 13-25 | 13-25 | 13-25 | 13-25 | 9-25 |
| $C_{12-18}$ Ethoxylate Sulfate | — | — | 0-3 | — | 0-1 |
| $C_{14-15}$ alkyl ethoxylate (EO = 7) | 0-3 | 0-3 | — | 0-5 | 0-3 |
| Dimethyl hydroxyethyl lauryl ammonium chloride | — | — | 0-2 | 0-2 | 0-2 |
| $C_{8-10}$—N$^+$(CH$_3$)$_2$—(CH$_2$CH$_2$)OH | 20-40 | — | 18-33 | 12-22 | 0-15 |
| Sodium tripolyphosphate K1 | | | | | |
| Zeolite | 0-10 | 20-40 | 0-3 | — | — |
| Silicate builder | 0-10 | 0-10 | 0-10 | 0-10 | 0-10 |
| Carbonate | 0-30 | 0-30 | 0-30 | 5-25 | 0-20 |
| Diethylene triamine penta acetate | 0-1 | 0-1 | 0-1 | 0-1 | 0-1 |
| Polyacrylate | 0-3 | 0-3 | 0-3 | 0-3 | 0-3 |
| Carboxy Methyl Cellulose | 0.2-0.8 | 0.2-0.8 | 0.2-0.8 | 0.2-0.8 | 0.2-0.8 |
| Polymer[1] | 0.05-10 | 0.05-10 | 5.0 | 2.5 | 1.0 |
| Percarbonate | 0-10 | 0-10 | 0-10 | 0-10 | 0-10 |
| Nonanoyloxybenzenesulfonate | — | — | 0-2 | 0-2 | 0-2 |
| Tetraacetylethylenediamine | — | — | 0-0.6 | 0-0.6 | 0-0.6 |
| Zinc Phthalocyanine Tetrasulfonate | — | — | 0-0.005 | 0-0.005 | 0-0.005 |
| Brightener | 0.05-0.2 | 0.05-0.2 | 0.05-0.2 | 0.05-0.2 | 0.05-0.2 |
| $MgSO_4$ | — | — | 0-0.5 | 0-0.5 | 0-0.5 |
| Enzymes | 0-0.5 | 0-0.5 | 0-0.5 | 0-0.5 | 0-0.5 |
| Minors (perfume, dyes, suds stabilizers) | balance | balance | balance | balance | balance |

[1] An alkoxylated polyalkanolamine polymers or a mixture of polymers according to any of Examples 1, 2, 3, 4, 5, 6, 7, 8, 9, or 10 or mixtures thereof.

Example 12

Granular Laundry Detergent

Aqueous Slurry Composition.

| Component | % w/w Aqueous slurry |
|---|---|
| A compound having the following general structure: bis(($C_2H_5O$)($C_2H_4O$)n)($CH_3$)—$N^+$—$C_xH_{2x}$—$N^+$—($CH_3$)-bis(($C_2H_5O$)($C_2H_4O$)n), wherein n = from 20 to 30, and x = from 3 to 8, or sulphated or sulphonated variants thereof | 1.23 |
| Ethylenediamine disuccinic acid | 0.35 |
| Brightener | 0.12 |
| Magnesium sulphate | 0.72 |
| Acrylate/maleate copolymer | 6.45 |
| Polymer[1] | 1.60 |
| Linear alkyl benzene sulphonate | 11.92 |
| Hydroxyethane di(methylene phosphonic acid) | 0.32 |
| Sodium carbonate | 4.32 |
| Sodium sulphate | 47.49 |
| Soap | 0.78 |
| Water | 24.29 |
| Miscellaneous | 0.42 |
| Total Parts | 100.00 |

[1] An alkoxylated polyalkanolamine polymers or a mixture of polymers according to any of Examples 1, 2, 3, 4, 5, 6, 7, 8, 9, or 10 or mixtures thereof.

Preparation of a Spray-Dried Powder.

An aqueous slurry having the composition as described above is prepared having a moisture content of 25.89%. The aqueous slurry is heated to 72° C. and pumped under high pressure (from $5.5 \times 10^6 Nm^{-2}$ to $6.0 \times 10^6 Nm^{-2}$), into a counter current spray-drying tower with an air inlet temperature of from 270° C. to 300° C. The aqueous slurry is atomised and the atomised slurry is dried to produce a solid mixture, which is then cooled and sieved to remove oversize material (>1.8 mm) to form a spray-dried powder, which is free-flowing. Fine material (<0.15 mm) is elutriated with the exhaust the exhaust air in the spray-drying tower and collected in a post tower containment system. The spray-dried powder has a moisture content of 1.0 wt %, a bulk density of 427 g/l and a particle size distribution such that 95.2 wt % of the spray-dried powder has a particle size of from 150 to 710 micrometers. The composition of the spray-dried powder is given below.

Spray-Dried Powder Composition.

| Component | % w/w Spray-dried powder |
|---|---|
| A compound having the following general structure: bis(($C_2H_5O$)($C_2H_4O$)n)($CH_3$)—$N^+$—$C_xH_{2x}$—$N^+$—($CH_3$)-bis(($C_2H_5O$)($C_2H_4O$)n), wherein n = from 20 to 30, and x = from 3 to 8, or sulphated or sulphonated variants thereof | 1.62 |
| Ethylenediamine disuccinic acid | 0.46 |
| Brightener | 0.16 |
| Magnesium sulphate | 0.95 |
| Acrylate/maleate copolymer | 8.45 |
| Polymer[1] | 2.09 |
| Linear alkyl benzene sulphonate | 15.65 |
| Hydroxyethane di(methylene phosphonic acid) | 0.42 |
| Sodium carbonate | 5.65 |
| Sodium sulphate | 61.98 |
| Soap | 1.02 |
| Water | 1.00 |
| Miscellaneous | 0.55 |
| Total Parts | 100.00 |

[1] An alkoxylated polyalkanolamine polymers or a mixture of polymers according to any of Examples 1, 2, 3, 4, 5, 6, 7, 8, 9, or 10 or mixtures thereof.

Preparation of an Anionic Surfactant Particle 1

The anionic detersive surfactant particle 1 is made on a 520 g batch basis using a Tilt-A-Pin then Tilt-A-Plow mixer (both made by Processall). 108 g sodium sulphate supplied is added to the Tilt-A-Pin mixer along with 244 g sodium carbonate. 168 g of 70% active $C_{25}E_3S$ paste (sodium ethoxy sulphate based on $C_{12/15}$ alcohol and ethylene oxide) is added to the Tilt-A-Pin mixer. The components are then mixed at 1200 rpm for 10 seconds. The resulting powder is then transferred into a Tilt-A-Plow mixer and mixed at 200 rpm for 2 minutes to form particles. The particles are then dried in a fluid bed dryer at a rate of 2500 l/min at 120° C. until the equilibrium relative humidity of the particles is less than 15%. The dried particles are then sieved and the fraction through 1180 μm and on 250 μm is retained The composition of the anionic detersive surfactant particle 1 is as follows:

25.0% w/w $C_{25}E_3S$ sodium ethoxy sulphate 18.0% w/w sodium sulphate 57.0% w/w sodium carbonate Preparation of a Cationic Detersive Surfactant Particle 1

The cationic surfactant particle 1 is made on a 14.6 kg batch basis on a Morton FM-50 Loedige mixer. 4.5 kg of micronised sodium sulphate and 4.5 kg micronised sodium carbonate are premixed in the Morton FM-50 Loedige mixer. 4.6 kg of 40% active mono-$C_{12-14}$ alkyl mono-hydroxyethyl di-methyl quaternary ammonium chloride (cationic surfactant) aqueous solution is added to the Morton FM-50 Loedige mixer whilst both the main drive and the chopper are operating. After approximately two minutes of mixing, a 1.0 kg 1:1 weight ratio mix of micronised sodium sulphate and micronised sodium carbonate is added to the mixer. The resulting agglomerate is collected and dried using a fluid bed dryer on a basis of 2500 l/min air at 100-140° C. for 30 minutes. The resulting powder is sieved and the fraction through 1400 μm is collected as the cationic surfactant particle 1. The composition of the cationic surfactant particle 1 is as follows:

15% w/w mono-$C_{12-14}$ alkyl mono-hydroxyethyl di-methyl quaternary ammonium chloride 40.76% w/w sodium carbonate 40.76% w/w sodium sulphate 3.48% w/w moisture and miscellaneous Preparation of a Granular Laundry Detergent Composition 10.84 kg of the spray-dried powder of example 12 4.76 kg of the anionic detersive surfactant particle 1, 1.57 kg of the cationic detersive surfactant particle 1 and 7.83 kg (total amount) of other individually dosed dry-added material are dosed into a 1 m diameter concrete batch mixer operating at 24 rpm. Once all of the materials are dosed into the mixer, the mixture is mixed for 5 minutes to form a granular laundry detergent composition. The formulation of the granular laundry detergent composition is described below:

A Granular Laundry Detergent Composition.

| Component | % w/w granular laundry detergent composition |
|---|---|
| Spray-dried powder from earlier table in Example 12 | 43.34 |
| 91.6 wt % active linear alkyl benzene sulphonate flake supplied by Stepan under the tradename Nacconol 90G ® | 0.22 |
| Citric acid | 5.00 |
| Sodium percarbonate (having from 12% to 15% active AvO$x$) | 14.70 |
| Photobleach particle | 0.01 |
| Lipase (11.00 mg active/g) | 0.70 |
| Amylase (21.55 mg active/g) | 0.33 |
| Protease (56.00 mg active/g) | 0.43 |
| Tetraacetyl ethylene diamine agglomerate (92 wt % active) | 4.35 |
| Suds suppressor agglomerate (11.5 wt % active) | 0.87 |
| Acrylate/maleate copolymer particle (95.7 wt % active) | 0.29 |
| Green/Blue carbonate speckle | 0.50 |
| Anionic detersive surfactant particle 1 | 19.04 |
| Cationic detersive surfactant particle 1 | 6.27 |
| Sodium sulphate | 3.32 |
| Solid perfume particle | 0.63 |
| Total Parts | 100.00 |

Example 13

Liquid Laundry Detergent

| Ingredient | A wt % | B wt % | C wt % | D wt % | E wt % |
|---|---|---|---|---|---|
| Sodium alkyl ether sulfate | 14.4% | | 9.2% | 5.4% | |
| Linear alkylbenzene sulfonic acid | 4.4% | 12.2% | 5.7% | 1.3% | |
| Alkyl ethoxylate | 2.2% | 8.8% | 8.1% | 3.4% | |
| Amine oxide | 0.7% | 1.5% | | | |
| Citric acid | 2.0% | 3.4% | 1.9% | 1.0% | 1.6% |
| Fatty acid | 3.0% | 8.3% | | | 16.0% |
| Protease | 1.0% | 0.7% | 1.0% | | 2.5% |
| Amylase | 0.2% | 0.2% | | | 0.3% |
| Lipase | | | 0.2% | | |
| Borax | 1.5% | 2.4% | 2.9% | | |
| Calcium and sodium formate | 0.2% | | | | |
| Formic acid | | | | | 1.1% |
| Polymer[1] | 1.8% | 2.1% | | | 3.2% |
| Sodium polyacrylate | | | | 0.2% | |
| Sodium polyacrylate copolymer | | | 0.6% | | |
| DTPA[2] | 0.1% | | | | 0.9% |
| DTPMP[3] | | 0.3% | | | |
| EDTA[4] | | | | 0.1% | |
| Fluorescent whitening agent | 0.15% | 0.2% | 0.12% | 0.12% | 0.2% |
| Ethanol | 2.5% | 1.4% | 1.5% | | |
| Propanediol | 6.6% | 4.9% | 4.0% | | 15.7% |
| Sorbitol | | | 4.0% | | |
| Ethanolamine | 1.5% | 0.8% | 0.1% | | 11.0% |
| Sodium hydroxide | 3.0% | 4.9% | 1.9% | 1.0% | |
| Sodium cumene sulfonate | | 2.0% | | | |
| Silicone suds suppressor | | 0.01% | | | |
| Perfume | 0.3% | 0.7% | 0.3% | 0.4% | 0.6% |
| Opacifier[5] | | 0.30% | 0.20% | | 0.50% |
| Water | balance | balance | balance | balance | balance |
| | 100.0% | 100.0% | 100.0% | 100.0% | 100.0% |

[1] An alkoxylated polyalkanolamine polymers or a mixture of polymers according to any of Examples 1, 2, 3, 4, 5, 6, 7, 8, 9, or 10 or mixtures thereof.
[2] diethylenetriaminepentaacetic acid, sodium salt
[3] diethylenetriaminepentakismethylenephosphonic acid, sodium salt
[4] ethylenediaminetetraacetic acid, sodium salt
[5] Acusol OP 301

| Ingredient | F wt % | G wt % | H wt % | I wt % | J wt % | K wt % |
|---|---|---|---|---|---|---|
| Alkylbenzene sulfonic acid | 7 | 7 | 4.5 | 1.2 | 1.5 | 12.5 |
| Sodium C12-14 alkyl ethoxy 3 sulfate | 2.3 | 2.3 | 4.5 | 4.5 | 7 | 18 |
| C14-15 alkyl 8-ethoxylate | 5 | 5 | 2.5 | 2.6 | 4.5 | 4 |
| C12 alkyl dimethyl amine oxide | — | 2 | — | — | — | — |
| C12-14 alkyl hydroxyethyl dimethyl ammonium chloride | — | — | — | 0.5 | — | — |
| C12-18 Fatty acid | 2.6 | 3 | 4 | 2.6 | 2.8 | 11 |
| Citric acid | 2.6 | 2 | 1.5 | 2 | 2.5 | 3.5 |
| Protease enzyme | 0.5 | 0.5 | 0.6 | 0.3 | 0.5 | 2 |
| Amylase enzyme | 0.1 | 0.1 | 0.15 | — | 0.05 | 0.5 |
| Mannanase enzyme | 0.05 | — | 0.05 | — | — | 0.1 |
| Polymer[1] | 1.0 | .8 | 1 | 0.4 | 1.5 | 2.7 |
| Diethylenetriaminepenta(methylenephosphonic) acid | 0.2 | 0.3 | — | — | 0.2 | — |
| Hydroxyethane diphosphonic acid | — | — | 0.45 | — | — | 1.5 |
| FWA | 0.1 | 0.1 | 0.1 | — | — | 0.2 |
| Solvents (1,2 propanediol, ethanol), stabilizers | 3 | 4 | 1.5 | 1.5 | 2 | 4.3 |
| Hydrogenated castor oil derivative structurant | 0.4 | 0.3 | 0.3 | 0.1 | 0.3 | — |
| Boric acid | 1.5 | 2 | 2 | 1.5 | 1.5 | 0.5 |
| Na formate | — | — | — | 1 | — | — |
| Reversible protease inhibitor[3] | — | — | 0.002 | — | — | — |
| Perfume | 0.5 | 0.7 | 0.5 | 0.5 | 0.8 | 1.5 |
| Buffers (sodium hydroxide, Monoethanolamine) | To pH 8.2 | | | | | |
| Water and minors (antifoam, aesthetics, . . . ) | To 100 | | | | | |

[1]An alkoxylated polyalkanolamine polymers or a mixture of polymers according to any of Examples 1, 2, 3, 4, 5, 6, 7, 8, 9, or 10 or mixtures thereof.

| Ingredient | L wt % | M wt % | N wt % | O wt % | P wt % | Q wt % |
|---|---|---|---|---|---|---|
| Alkylbenzene sulfonic acid | 5.5 | 2.7 | 2.2 | 12.2 | 5.2 | 5.2 |
| Sodium C12-14 alkyl ethoxy 3 sulfate | 16.5 | 20 | 9.5 | 7.7 | 1.8 | 1.8 |
| Sodium C12-14 alkyl sulfate | 8.9 | 6.5 | 2.9 | — | | |
| C12-14 alkyl 7-ethoxylate | | | | | 0.15 | 0.15 |
| C14-15 alkyl 8-ethoxylate | | | | | 3.5 | 3.5 |
| C12-15 alkyl 9-ethoxylate | 1.7 | 0.8 | 0.3 | 18.1 | — | — |
| C12-18 Fatty acid | 2.2 | 2.0 | — | 1.3 | 2.6 | 2.6 |
| Citric acid | 3.5 | 3.8 | 2.2 | 2.4 | 2.5 | 2.5 |
| Protease enzyme | 1.7 | 1.4 | 0.4 | — | 0.5 | 0.5 |
| Amylase enzyme | 0.4 | 0.3 | — | — | 0.1 | 0.1 |
| Mannanase enzyme | | | | | 0.04 | 0.04 |
| Polymer[1] | 2.1 | 1.2 | 1.0 | 2 | 1.0 | 0.25 |
| PEG-PVAc Polymer[2] | — | — | — | — | — | 0.3 |
| Ethoxysulfated Hexamethylene Diamine Dimethyl Quat | — | — | — | — | — | 0.7 |
| Diethylenetriaminepenta (methylenephosphonic) acid | | | | | 0.2 | 0.2 |
| FWA | — | — | — | — | .04 | .04 |
| Solvents (1,2 propanediol, ethanol, stabilizers | 7 | 7.2 | 3.6 | 3.7 | 1.9 | 1.9 |
| Hydrogenated castor oil derivative structurant | 0.3 | 0.2 | 0.2 | 0.2 | 0.35 | 0.35 |
| Polyacrylate | — | — | — | 0.1 | — | — |
| Polyacrylate copolymer[3] | — | — | — | 0.5 | — | — |
| Sodium carbonate | — | — | — | 0.3 | — | — |
| Sodium silicate | — | — | — | — | — | — |
| Borax | 3 | 3 | 2 | 1.3 | — | — |
| Boric acid | 1.5 | 2 | 2 | 1.5 | 1.5 | 1.5 |
| Perfume | 0.5 | 0.5 | 0.5 | 0.8 | 0.5 | 0.5 |
| Buffers (sodium hydroxide, monoethanolamine) | | | | | 3.3 | 3.3 |
| Water, dyes and miscellaneous | Balance | | | | | |

[1]An alkoxylated polyalkanolamine polymers or a mixture of polymers according to any of Examples 1, 2, 3, 4, 5, 6, 7, 8, 9, or 10 or mixtures thereof.
[2]PEG-PVA graft copolymer is a polyvinyl acetate grafted polyethylene oxide copolymer having a polyethylene oxide backbone and multiple polyvinyl acetate side chains. The molecular weight of the polyethylene oxide backbone is about 6000 and the weight ratio of the polyethylene oxide to polyvinyl acetate is about 40 to 60 and no more than 1 grafting point per 50 ethylene oxide units.
[3]Alco 725 (styrene/acrylate)

Example 14

Liquid Dish Handwashing Detergents

| | Composition | |
|---|---|---|
| | A | B |
| $C_{12-13}$ Natural AE0.6S | 29.0 | 29.0 |
| $C_{10-14}$ mid-branched Amine Oxide | — | 6.0 |
| $C_{12-14}$ Linear Amine Oxide | 6.0 | — |
| SAFOL ® 23 Amine Oxide | 1.0 | 1.0 |
| $C_{11}E_9$ Nonionic[2] | 2.0 | 2.0 |
| Ethanol | 4.5 | 4.5 |
| Polymer[1] | 5.0 | 2.0 |
| Sodium cumene sulfonate | 1.6 | 1.6 |
| Polypropylene glycol 2000 | 0.8 | 0.8 |
| NaCl | 0.8 | 0.8 |

-continued

| | Composition | |
|---|---|---|
| | A | B |
| 1,3 BAC Diamine[3] | 0.5 | 0.5 |
| Suds boosting polymer[4] | 0.2 | 0.2 |
| Water | Balance | Balance |

[1]An alkoxylated polyalkanolamine polymers or a mixture of polymers according to any of Examples 1, 2, 3, 4, 5, 6, 7, 8, 9, or 10 or mixtures thereof.
[2]Nonionic may be either $C_{11}$ Alkyl ethoxylated surfactant containing 9 ethoxy groups.
[3]1,3, BAC is 1,3 bis(methylamine)-cyclohexane.
[4](N,N-dimethylamino)ethyl methacrylate homopolymer Example 15

Automatic Dishwasher Detergent

| | A | B | C | D | E |
|---|---|---|---|---|---|
| Polymer dispersant[2] | 0.5 | 5 | 6 | 5 | 5 |
| Carbonate | 35 | 40 | 40 | 35-40 | 35-40 |
| Sodium tripolyphosphate | 0 | 6 | 10 | 0-10 | 0-10 |
| Silicate solids | 6 | 6 | 6 | 6 | 6 |
| Bleach and bleach activators | 4 | 4 | 4 | 4 | 4 |
| Polymer[1] | 0.05-10 | 1 | 2.5 | 5 | 10 |
| Enzymes | 0.3-0.6 | 0.3-0.6 | 0.3-0.6 | 0.3-0.6 | 0.3-0.6 |
| Disodium citrate dihydrate | 0 | 0 | 0 | 2-20 | 0 |
| Nonionic surfactant[3] | 0 | 0 | 0 | 0 | 0.8-5 |
| Water, sulfate, perfume, dyes and other adjuncts | Balance to 100% | Balance to 100% | Balance to 100% | Balance to 100% | Balance to 100% |

[1]An alkoxylated polyalkanolamine polymers or a mixture of polymers according to any of Examples 1, 2, 3, 4, 5, 6, 7, 8, 9, or 10 or mixtures thereof.
[2]Such as ACUSOL ® 445N available from Rohm & Haas or ALCOSPERSE ® from Alco.
[3]Such as SLF-18 POLY TERGENT from the Olin Corporation.

Unless otherwise noted, all component or composition levels are in reference to the active level of that component or composition, and are exclusive of impurities, for example, residual solvents or by-products, which may be present in commercially available sources.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A laundry detergent or cleaning composition which comprises:
    A) a surfactant system; and
    B) an alkoxylated polyalkanolamine polymer obtainable by a process comprising the steps of
    a) poly-condensation of at least one compound selected from N-(hydroxyalkyl)amines of formulae (I.a) and/or (I.b),

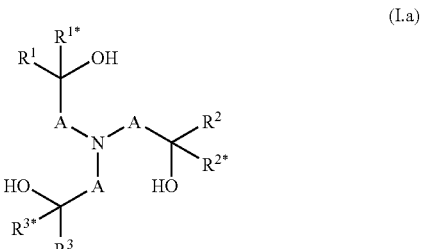

(I.a)

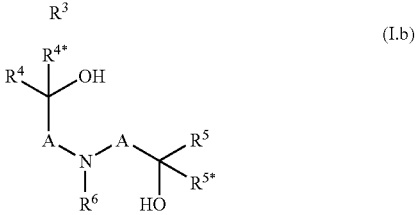

(I.b)

wherein:
A are independently selected from $C_1$-$C_6$-alkylene;
$R^1$, $R^{1*}$, $R^2$, $R^{2*}$, $R^3$, $R^{3*}$, $R^4$, $R^{4*}$, $R^5$ and $R^{5*}$ are independently selected from hydrogen, alkyl, cycloalkyl or aryl, wherein the last three mentioned radicals may be optionally substituted; and
$R^6$ is selected from hydrogen, alkyl, cycloalkyl or aryl, wherein the last three mentioned radicals may be optionally substituted; and
b) reacting at least a part of the available hydroxy groups of the polymeric condensate provided in step a) and/or, if present, at least a part of the secondary amino groups of the polymeric condensate provided in step a) with at least one alkylene oxide; and
c) optionally further reacting said alkoxylated polyalkanolamine polymers by quarternization, protonation, sulphation and/or phosphation.

2. A laundry detergent or cleaning composition according to claim 1 wherein the laundry detergent or cleaning composition is selected from the group consisting of liquid laundry detergent compositions, solid laundry detergent compositions, hard surface cleaning compositions, liquid hand dishwashing compositions, solid automatic dishwashing compositions, liquid automatic dishwashing, and tab/unit dose form automatic dishwashing compositions.

3. A laundry detergent or cleaning composition according to claim 1 wherein the detergent or cleaning composition comprises from about 0.05 to about 10% by weight of the detergent or cleaning composition, of the alkoxylated polyalkanolamine polymer.

4. A laundry detergent or cleaning composition according to claim 1 wherein the alkoxylated polyalkanolamine polymer is obtainable by a process wherein step b) is performed in the presence of a base.

5. A laundry detergent or cleaning composition according to claim 1 wherein the polymer is obtainable by a process wherein in step a) the at least one compound selected from N-(hydroxyalkyl)amines of formulae (I.a) and/or (I.b) is being co-condensed with at least one compound selected from polyols of formula $Y(OH)_n$, wherein n is an integer from 2 to 4 and Y denotes a bivalent, trivalent or tetravalent aliphatic, cycloaliphatic or aromatic radical having 2 to 10 carbon atoms.

6. A laundry detergent or cleaning composition according to claim 1 wherein the polymer is obtainable by a process wherein in step a) the at least one compound selected from N-(hydroxyalkyl)amines of formulae (I.a) and/or (I.b) is being co-condensed with at least one compound selected from polyamines of formula $Y'(NHR^y)_m$, wherein m is an integer from 2 to 4, Y' denotes a bivalent, trivalent or tetravalent aliphatic, cycloaliphatic or aromatic radical having 2 to 10 carbon atoms and $R^y$ has one of the meanings given for $R^6$ or two radicals $R^y$ together may form a $C_1$-$C_6$-alkylene group.

7. A laundry detergent or cleaning composition according to claim 1 wherein the A of the at least one compound selected from N-(hydroxyalkyl)amines of formulae (I.a) and/or (I.b) is a methylene group which is substituted or caries one substituent selected from $C_1$-$C_4$ alkyl.

8. A laundry detergent or cleaning composition according to claim 1 wherein $R^1, R^{1*}, R^2, R^{2*}, R^3, R^{3*}, R^4, R^{4*}, R^5, R^{5*}$ and $R^6$ of the at least one compound selected from N-(hydroxyalkyl)amines of formulae (I.a) and or (I.b) are independently selected from hydrogen and $C_1$-$C_4$ alkyl.

9. A laundry detergent or cleaning composition according to claim 1 wherein the at least one alkylene oxide is selected from epoxyethane, epoxypropane, 1,2-epoxybutane, 2,3-epoxybutane, 1,2-epoxy-2-methylpropane, 1,2-epoxypentane, 2,3-epoxypentane, 1,2-epoxy-2-methylbutane, 2,3-epoxy-2-methylbutane, 1,2-epoxyhexane, 2,3-epoxyhexane, 3,4-epoxyhexane and 1,2-epoxyethylenebenzene.

10. A laundry detergent or cleaning composition according to claim 1 wherein in step b) about 1 to about 100 moles of the at least one alkylene oxide are reacted with about 1 mol of the remaining hydroxy and, if present, of the secondary amino groups of the polymeric condensate provided in step a).

11. A laundry detergent or cleaning composition according to claim 1 wherein the alkoxylated polyalkanolamine polymer has an number average molecular weight of from about 500 to about 100,000 g/mol.

12. A laundry detergent or cleaning composition according to claim 1 wherein the surfactant system comprises $C_{10}$-$C_{16}$ alkyl benzene sulfonates.

13. A laundry detergent or cleaning composition according to claim 1 wherein the surfactant system comprises $C_8$-$C_{18}$ linear alkyl sulfonate surfactant.

14. A laundry detergent or cleaning composition according to claims 12 or 13 wherein the surfactant system further comprises one or more co-surfactant selected from the groups consisting of nonionic surfactants, cationic surfactants, anionic surfactants and mixtures thereof.

15. A laundry detergent or cleaning composition according to claim 1 wherein the detergent or composition further comprises cleaning adjunct additives.

16. A cleaning implement comprising a nonwoven substrate and the laundry detergent or cleaning composition according to claim 1.

\* \* \* \* \*